(12) United States Patent
Brown et al.

(10) Patent No.: US 10,268,889 B2
(45) Date of Patent: Apr. 23, 2019

(54) SYSTEM FOR TARGET MATERIAL DETECTION

(71) Applicant: THE BOEING COMPANY, Chicago, IL (US)

(72) Inventors: Timothy E. Brown, Edwardsville, IL (US); Robert J. Klein, Ballwin, MO (US)

(73) Assignee: The Boeing Company, Chicago, IL (US)

( * ) Notice: Subject to any disclaimer, the term of this patent is extended or adjusted under 35 U.S.C. 154(b) by 6 days.

(21) Appl. No.: 15/476,562

(22) Filed: Mar. 31, 2017

(65) Prior Publication Data

US 2018/0285640 A1    Oct. 4, 2018

(51) Int. Cl.
| | |
|---|---|
| *G06K 9/00* | (2006.01) |
| *G01J 3/28* | (2006.01) |
| *G01J 3/42* | (2006.01) |
| *G06K 9/34* | (2006.01) |

(Continued)

(52) U.S. Cl.
CPC ........ *G06K 9/00637* (2013.01); *G01J 3/2823* (2013.01); *G01J 3/42* (2013.01); *G06K 9/00657* (2013.01); *G06K 9/34* (2013.01); *G06K 9/4661* (2013.01); *G06K 9/6201* (2013.01); *G06K 2009/00644* (2013.01); *G06K 2009/4657* (2013.01)

(58) Field of Classification Search
None
See application file for complete search history.

(56) References Cited

U.S. PATENT DOCUMENTS

| | | | | |
|---|---|---|---|---|
| 5,684,935 A | * | 11/1997 | Demesa ................ | G06T 15/205 345/419 |
| 6,958,466 B1 | * | 10/2005 | Stein .................... | G06K 9/0063 250/208.1 |

(Continued)

OTHER PUBLICATIONS

Bhandari, Amrita, and K. C. Tiwari. "A Review of Spectral Unmixing Techniques in Target Detection." (Year: 2015).*

(Continued)

*Primary Examiner* — Bhavesh M Mehta
*Assistant Examiner* — Samah A Beg
(74) *Attorney, Agent, or Firm* — Womble Bond Dickinson (US) LLP (57) ABSTRACT

A method of identifying a target material in a spectral image includes acquiring a spectral image of a scene. The method also includes performing image segmentation to partition the spectral image into a plurality of segments. The method includes accessing a database of spectral models of a plurality of materials to determine a material whose spectral model is most similar to the spectral data for the segment, a difference between the spectral model of the material and the spectral data for the segment including measurable reflectance or radiance at characteristic frequencies or wavelengths. The method also includes analyzing a database of spectral data for a plurality of target materials to identify a target material whose spectral data also has measurable reflectance or radiance at the characteristic frequencies or wavelengths. And the method includes outputting an identifier of the target material for display with the spectral image.

18 Claims, 7 Drawing Sheets

(51) Int. Cl.
*G06K 9/46* (2006.01)
*G06K 9/62* (2006.01)

(56) References Cited

U.S. PATENT DOCUMENTS

| | | | | |
|---|---|---|---|---|
| 7,450,761 | B2* | 11/2008 | Portigal | G06K 9/0063 |
| | | | | 382/103 |
| 8,195,005 | B2* | 6/2012 | Huang | A61B 5/1171 |
| | | | | 382/284 |
| 8,659,656 | B1* | 2/2014 | Cruz-Albrecht | G06K 9/00986 |
| | | | | 341/138 |
| 8,755,564 | B1* | 6/2014 | Kukshya | G06K 9/0063 |
| | | | | 382/103 |
| 9,053,393 | B2* | 6/2015 | Yoshii | G06K 9/6282 |
| 9,501,838 | B1* | 11/2016 | Baker | G06K 9/6247 |
| 2002/0012461 | A1* | 1/2002 | MacKinnon | H04N 1/60 |
| | | | | 382/164 |
| 2006/0008150 | A1* | 1/2006 | Zhao | G06K 9/00248 |
| | | | | 382/190 |
| 2006/0233421 | A1* | 10/2006 | Portigal | G06K 9/0063 |
| | | | | 382/103 |
| 2008/0294032 | A1* | 11/2008 | Levenson | A61B 5/0059 |
| | | | | 600/407 |
| 2009/0232349 | A1* | 9/2009 | Moses | G06F 9/5072 |
| | | | | 382/100 |
| 2009/0245605 | A1* | 10/2009 | Levenson | A61B 5/0059 |
| | | | | 382/128 |
| 2010/0179934 | A1* | 7/2010 | Howley | G01J 3/28 |
| | | | | 706/12 |
| 2010/0332210 | A1* | 12/2010 | Birdwell | G06F 17/30442 |
| | | | | 703/22 |
| 2013/0093919 | A1* | 4/2013 | Imai | G01J 3/0235 |
| | | | | 348/229.1 |
| 2014/0185864 | A1* | 7/2014 | Halper | G06K 9/0063 |
| | | | | 382/103 |
| 2014/0270359 | A1* | 9/2014 | Baker | G06K 9/0063 |
| | | | | 382/103 |
| 2016/0150213 | A1* | 5/2016 | Mutti | G01N 33/02 |
| | | | | 348/143 |
| 2018/0245979 | A1* | 8/2018 | Park | G01J 3/2823 |

OTHER PUBLICATIONS

Healey, Glenn, and David Slater. "Models and methods for automated material identification in hyperspectral imagery acquired under unknown illumination and atmospheric conditions."IEEE Transactions on Geoscience and Remote Sensing37.6 (1999): 2706-2717. (Year: 1999).*

Shippert, P.,"Introduction to Hyperspectral Image Analysis", last accessed Jul. 20, 2016. http:// spacejournal.ohio.edu/pdf/shippert.pdf.

* cited by examiner

SYSTEM FOR TARGET MATERIAL DETECTION

CROSS-REFERENCE TO RELATED APPLICATION(S)

The present application is related to U.S. patent application Ser. No. 15/201,136, entitled: Method and Apparatus for Simulating Spectral Information of Geographic Areas, U.S. patent application Ser. No. 15/201,137, entitled: Method and Apparatus for Using a Regionally Specific Spectral Model to Identify the Spectral Bands for use for Isolating Remotely Sensed Materials of Interest, and U.S. patent application Ser. No. 15/201,141, entitled: Method and Apparatus for On-Board Selection of Bands of a Hyperspectral Sensor Based on Simulated Spectral Representation of the Region of Interest, all of which filed on Jul. 1, 2016. The contents of all of the aforementioned are incorporated herein by reference.

TECHNOLOGICAL FIELD

The present disclosure relates generally to identifying target materials and, in particular, incorporating spectral models in the identification of target materials.

BACKGROUND

Mobile remote sensing platforms are a rich source of geographical data. Such mobile platforms may include terrestrial platforms, aerial collection platforms such as aircraft and satellites in low-earth orbits (LEO), medium earth orbits (MEO), or geosynchronous/geostationary orbits. Mobile platforms use one or more sensors to collect geographical data. These sensors have a wide variety of sensor characteristics, including bandwidth, wavelengths resolution, and sensing technique, depending upon the application and information desired.

With regard to sensing techniques, the mobile remote sensing platform sensor(s) may be passive (e.g. simply sense energy emitted from targets. With regard to wavelengths, sensors may operate in a variety of bandwidths including ultraviolet, visual and infrared (near-infrared (NIR), short wave infrared (SWIR) and long wave infrared (LWIR). Sensor resolution may be defined in terms of spatial resolution (e.g. the pixel size of an image representing the area of the imaged surface as determined by the sensors' instantaneous field of view also referred to as ground sample distance (GSD); spectral resolution (e.g. the number of wavelengths (bands) collected), temporal resolution (e.g. the time period between measurements) and radiometric resolution (e.g. the effective bit depth or dynamic range of the sensor).

In many cases, mobile remote sensing platforms are used to search for and find "target" geographical features in a particular area. For example, a mobile remote sensing platform may be used to determine the extent of damage caused by a recent forest fire. In such cases, the sensor characteristics are usually chosen to maximize discriminants between the "target" and the background. Because the characteristics of the target and the background are typically not known apriori, this can be problematic, particularly with mobile remote sensing platforms, especially those mobile platforms that cannot be remotely configured in real or near real time.

One potential solution to this problem is to use hyperspectral imagers. Like other sensors or sensor suites, hyperspectral imagers collect and process data from across the electromagnetic wave spectrum. But unlike other multispectral imagers (which measure radiation reflected from a surface at a few wide, separated wavelength bands) hyperspectral imagers measure reflected radiation at a series of narrow and (typically) contiguous wavelength bands. This permits the gathering of more detailed spectral information which can provide much more information about the surface than a multispectral sensor and can reduce the guesswork in choosing how to best spectrally configure the mobile remote sensing platform sensor to collect information of interest.

However, this solution can stress hyperspectral imaging processing requirements on the mobile remote sensing platform and/or bandwidth and latency requirements of the communication link between the mobile remote sensing platform and the base station. Furthermore, while hyperspectral sensing might ease the planning of which spectral bands to collect, they do not solve and may well worsen sensor resolution and update concerns.

Therefore it would be desirable to have a system and method that takes into account at least some of the issues discussed above, as well as other possible issues.

BRIEF SUMMARY

To address the requirements described above, the above cited and incorporated '136, '137 and '141 applications describe systems and methods of geographic information system (GIS)-based spectral simulation. The disclosed systems and methods provide spectral simulation of geographic areas (locations). In some instances, however, it would be beneficial to have a system and method that addresses materials depicted in images independent of their geographic area. Example implementations of the present disclosure are generally directed to a system, and corresponding method and computer-readable storage medium for implementing a target material identification system that incorporates the spectral models similar to those provided by the systems and methods disclosed in the aforementioned applications.

In some example implementations, the system and method acquires a spectral image of a scene from a hyperspectral sensor mounted on the ground, elevated position, or low altitude aircraft. The system and method segments the spectral image into areas that are of similar materials, and the materials in these areas are identified using a spectral model built by fusing spectral data with spectral libraries or by collecting new spectral libraries under different conditions. A list of target materials is analyzed against the relevant model for each segmented material to determine whether or not statistically anomalous target materials are present. The data may be represented in an image (e.g., augmented reality (AR), a monitor), and detections may be streamed as overlays to the visual image.

The present disclosure thus includes, without limitation, the following example implementations.

Some example implementations provide a method identifying a target material in a spectral image, the method comprising acquiring a spectral image of a scene, the spectral image being composed of a plurality of pixels each of which has spectral data; performing image segmentation to partition the spectral image into a plurality of segments each of which includes a respective set of pixels of the spectral image that are similar with respect to the spectral data, the spectral image including spectral data for each segment of the plurality of segments; and for a segment of the plurality of segments, accessing a database of spectral models of a plurality of materials to determine a material whose spectral model is most similar to the spectral data for the segment, a difference between the spectral model of the material and the spectral data for the segment including measurable reflectance or radiance at characteristic frequencies or wavelengths; analyzing a database of spectral data for a plurality of target materials to identify a target material whose spectral data also has measurable reflectance or radiance at the characteristic frequencies or wavelengths; and outputting an identifier of the target material for display with the spectral image.

In some example implementations of the method of any preceding or any subsequent example implementation, or any combination thereof, the spectral data for each segment satisfies a predetermined statistical criterion of spectral data for the respective set of pixels in the segment.

In some example implementations of the method of any preceding or any subsequent example implementation, or any combination thereof, the database of spectral models and the database of spectral data are respectively accessed and analyzed for each segment of the plurality of segments to identify the target material for the segment, and any target material in any other segment of the plurality of segments.

In some example implementations of the method of any preceding or any subsequent example implementation, or any combination thereof, the database of spectral data includes for at least some of the target materials, spectral data in different percentages of the target materials, the database of spectral data being analyzed to identify a target material of a particular percentage that also has measurable reflectance or radiance at the characteristic frequencies or wavelengths.

In some example implementations of the method of any preceding or any subsequent example implementation, or any combination thereof, the database of spectral data includes measurable reflectance or radiance only at key frequencies or wavelengths, and analyzing the database of spectral data includes analyzing the database of spectral data to identify the target material whose spectral data with key frequencies or wavelengths that most closely match the characteristic frequencies or wavelengths.

In some example implementations of the method of any preceding or any subsequent example implementation, or any combination thereof, producing difference spectral data from the difference between the spectral model of the material and the spectral data for the segment, and wherein analyzing the database of spectral data includes analyzing the database of spectral data to identify the target material whose spectral data most closely matches the difference spectral data.

In some example implementations of the method of any preceding or any subsequent example implementation, or any combination thereof, analyzing the database of spectral data comprises: mixing the spectral model of the material with various ones of the spectral data from the database of spectral data to determine a spectral model of a composition of the material and a target material that is most similar to the spectral data for the segment; and identifying the target material in the composition as the target material whose spectral data also has measurable reflectance or radiance at the characteristic frequencies or wavelengths.

Some example implementations provide an apparatus for identifying a target material in a spectral image. The apparatus comprises a processor and a memory storing executable instructions that, in response to execution by the processor, cause the apparatus to at least perform the method of any preceding example implementation, or any combination thereof. This may include implementation of a target material identification system including segmentation subsystem and target identification subsystem coupled to one another and configured to perform steps of the method.

Some example implementations provide a computer readable medium for identifying a target material in a spectral image. The computer-readable storage medium is non-transitory and having computer-readable program code portions stored therein that, in response to execution by a processor, cause an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like (e.g., planar, coplanar, perpendicular). Unless otherwise stated, any one or more if not all of these may be absolute or approximate to account for acceptable variations that may occur, such as those due to engineering tolerances or the like. Like reference numerals refer to like elements throughout.

Figure 1:
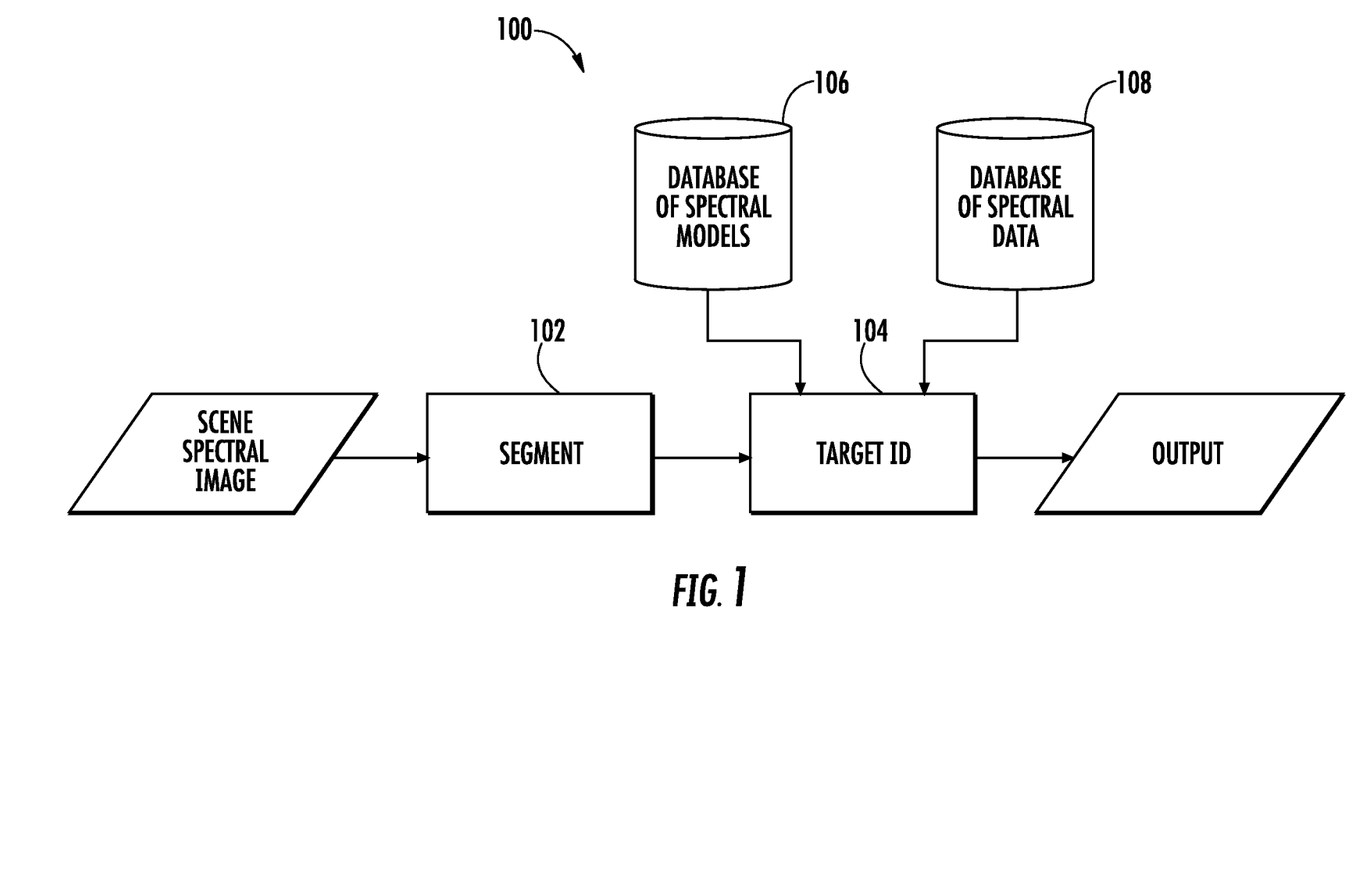
FIG. 1 illustrates a system according to example implementations of the present disclosure.

FIG. 1 illustrates a system 100 for identifying a target material in a spectral image, according to example implementations of the present disclosure. The target material identification system is configured to perform a number of different functions or operations, either automatically, under direct operator control, or some combination of thereof. In this regard, in some examples, the system is configured to perform one or more of its functions or operations automatically, that is, without being directly controlled by an operator. Additionally or alternatively, in some examples, the system is configured to perform one or more of its functions or operations under direct operator control.

The target material identification system 100 may include one or more of each of any of a number of different subsystems (each an individual system) for performing one or more of its functions or operations. As shown, for example, the system may include a segmentation subsystem 102 and a target identification (ID) subsystem 104 coupled to one another. Although being shown together as part of the system, it should be understood that either of the subsystems may function or operate as a separate system without regard to the other. And further, it should be understood that the system may include one or more additional or alternative subsystems than those shown in FIG. 1.

According to some example implementations, the segmentation subsystem 102 is generally configured to acquire a spectral image of a scene in which spectral image is composed of a plurality of pixels each of which has spectral data. The segmentation subsystem is configured to perform image segmentation to partition the spectral image into a plurality of segments each of which includes a respective set of pixels of the spectral image that are similar with respect to the spectral data. The spectral image includes spectral data for each segment of the plurality of segments. In some examples, the spectral data for each segment satisfies a predetermined statistical criterion of spectral data for the respective set of pixels in the segment. In a more particular example, the spectral data for each segment is an average of spectral data for the respective set of pixels in the segment. Other examples of predetermined statistical criterion include the mean, maximum or minimum of spectral data for the respective set of pixels in the segment.

For a segment of the plurality of segments, the target ID subsystem 104 is generally configured to access a database 106 of spectral models of a plurality of materials to determine a material whose spectral model is most similar to the spectral data for the segment, a difference between the spectral model of the material and the spectral data for the segment including measurable reflectance or radiance at characteristic frequencies or wavelengths. The target ID subsystem is also configured to analyze a database 108 of spectral data for a plurality of target materials to identify a target material whose spectral data also has measurable reflectance or radiance at the characteristic frequencies or wavelengths. And the target ID subsystem is configured to output an identifier of the target material for display with the spectral image.

In some examples, the target ID subsystem 104 is configured to access and analyze respectively the database 106 of spectral models and the database 108 of spectral data for each segment of the plurality of segments to identify the target material for the segment, and any target material in any other segment of the plurality of segments.

For any segment, the target ID subsystem 104 may identify the target material in any of a number of different manners. In some examples, the database 108 of spectral data includes for at least some of the target materials, spectral data in different percentages of the target materials. In these examples, the target ID subsystem is configured to analyze the database of spectral data to identify a target material of a particular percentage that also has measurable reflectance or radiance at the characteristic frequencies or wavelengths.

In some examples, the database 108 of spectral data includes measurable reflectance or radiance only at key frequencies or wavelengths. In these examples, the target ID subsystem 104 is configured to analyze the database of spectral data to identify the target material whose spectral data with key frequencies or wavelengths that most closely match the characteristic frequencies or wavelengths.

In some examples, the target ID subsystem 104 is configured to produce difference spectral data from the difference between the spectral model of the material and the spectral data for the segment. In these examples, the target ID subsystem is configured to analyze the database 108 of spectral data to identify the target material whose spectral data most closely matches the difference spectral data.

In some examples, the target ID subsystem 104 is configured to mix the spectral model of the material with various ones of the spectral data from the database 108 of spectral data to determine a spectral model of a composition of the material and a target material that is most similar to the spectral data for the segment. And in these examples, the target ID subsystem is configured to identify the target material in the composition as the target material whose spectral data also has measurable reflectance or radiance at the characteristic frequencies or wavelengths.

To further illustrate example implementations of the present disclosure, FIGS. 2-5 illustrate an example implementation of the system 100 for identifying a target material.

Figure 2A:
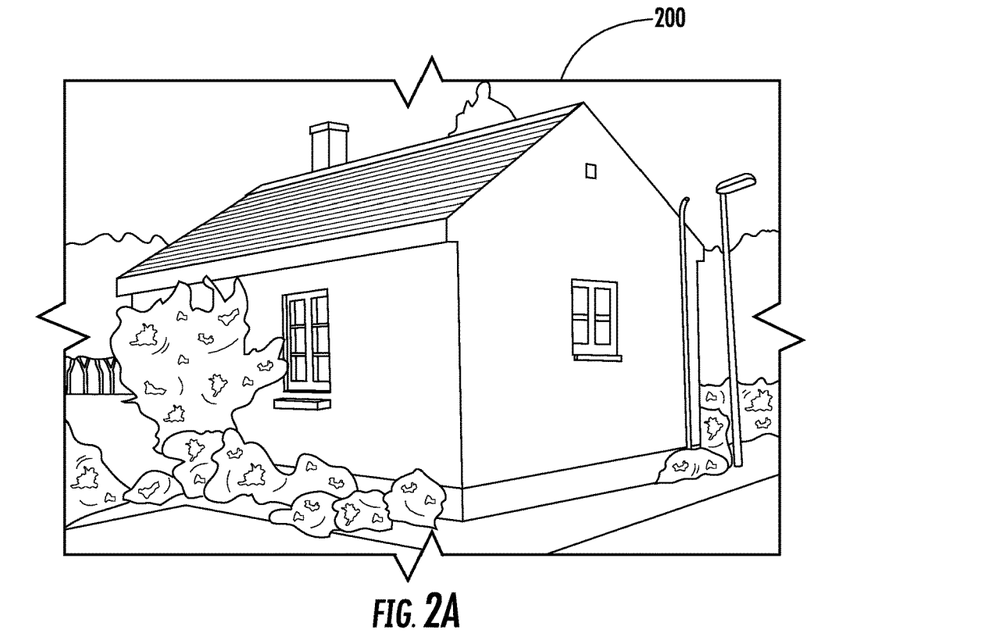
FIG. 2A illustrates a spectral image.
Figure 2B:
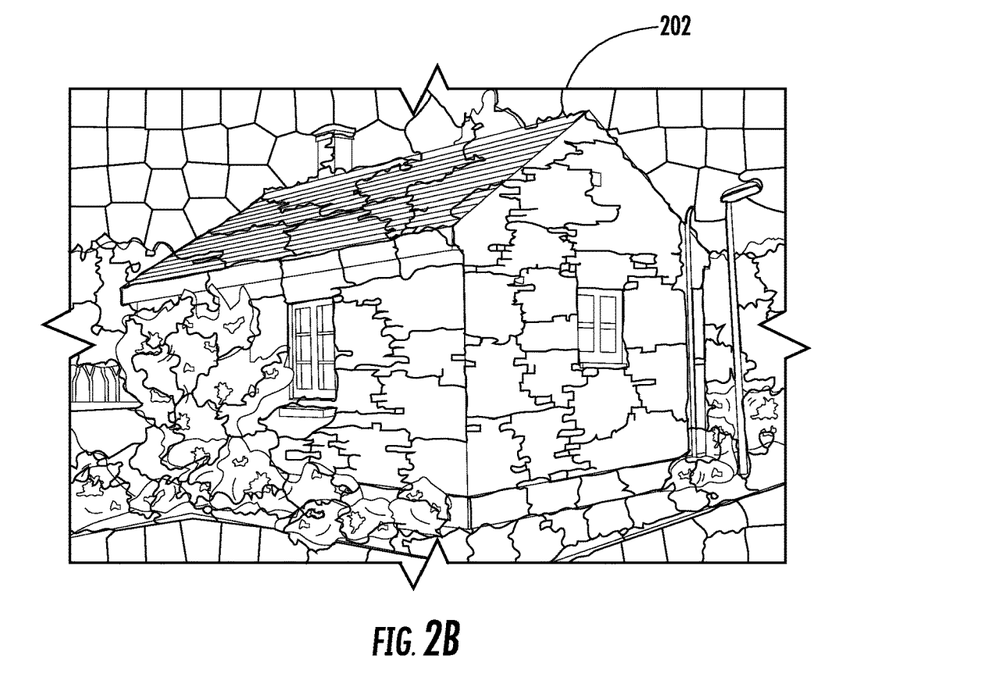
FIG. 2B illustrates the spectral image partitioned into a plurality of segments, according to example implementations.
Figure 3:
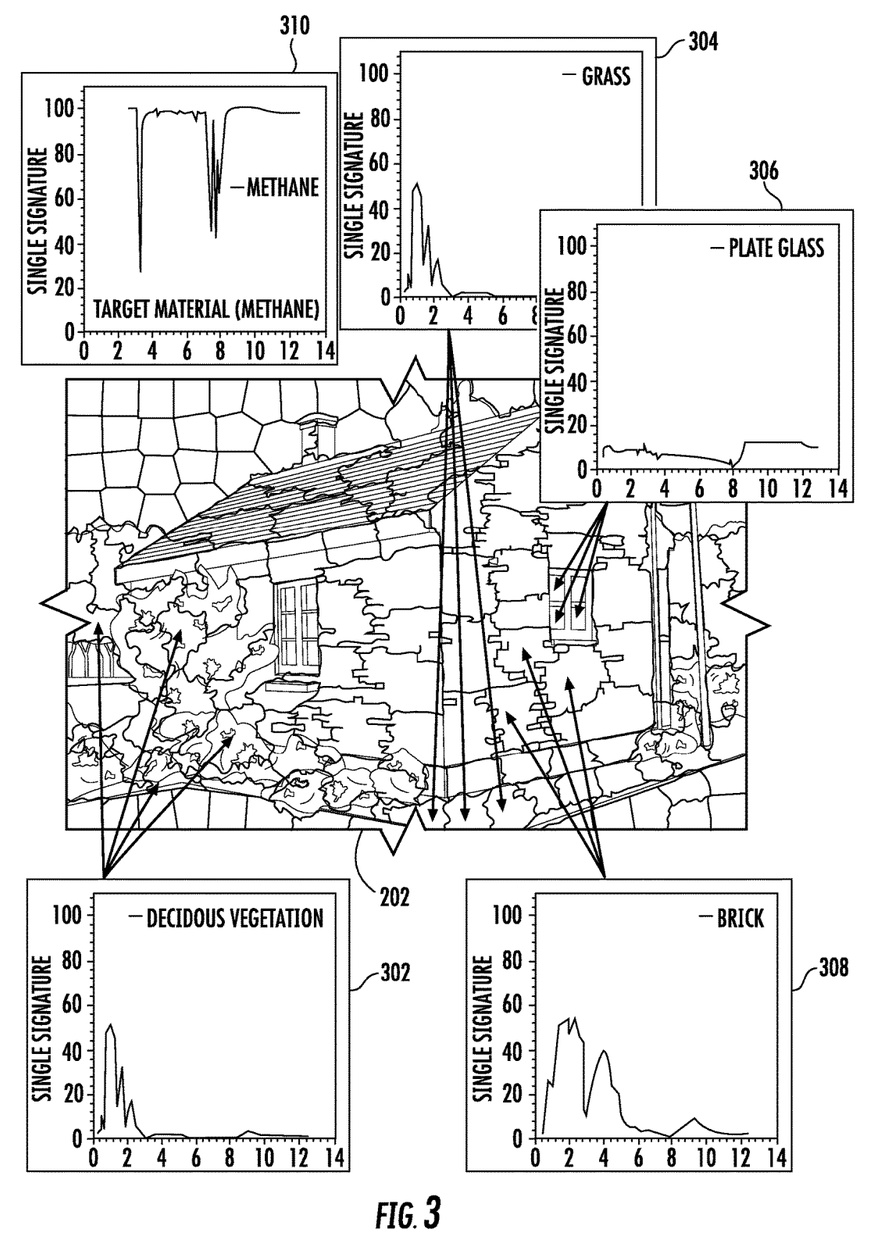
FIG. 3 illustrates the segmented spectral image of FIG. 2B, and includes material whose spectral models are most similar to the spectral data for various segments.

FIG. 2A illustrates a spectral image 200 that is acquired by the segmentation subsystem 102, and FIG. 2B illustrates the spectral image partitioned into a plurality of segments. Each segment of the partitioned spectral image 202 includes a respective set of pixels of the spectral image that are similar with respect to the spectral data. As illustrated in FIG. 3, the target ID subsystem 104 accesses the database 106 of spectral models of a plurality of materials to determine the material whose spectral model is most similar to the spectral data for the segment. In this example, the spectral models include spectral models of deciduous vegetation 302, grass 304, plate glass 306 and brick 308. The target ID subsystem also determines a difference between the spectral model of the material and the spectral data for the segment including measurable reflectance or radiance at characteristic frequencies or wavelengths. In this example, the target ID subsystem also analyzes the database 108 of spectral data and identifies methane gas as the target material whose spectral data also has measurable reflectance or radiance at the characteristic frequencies or wavelengths. FIG. 3 illustrates spectral data for methane 310.

Figure 4:
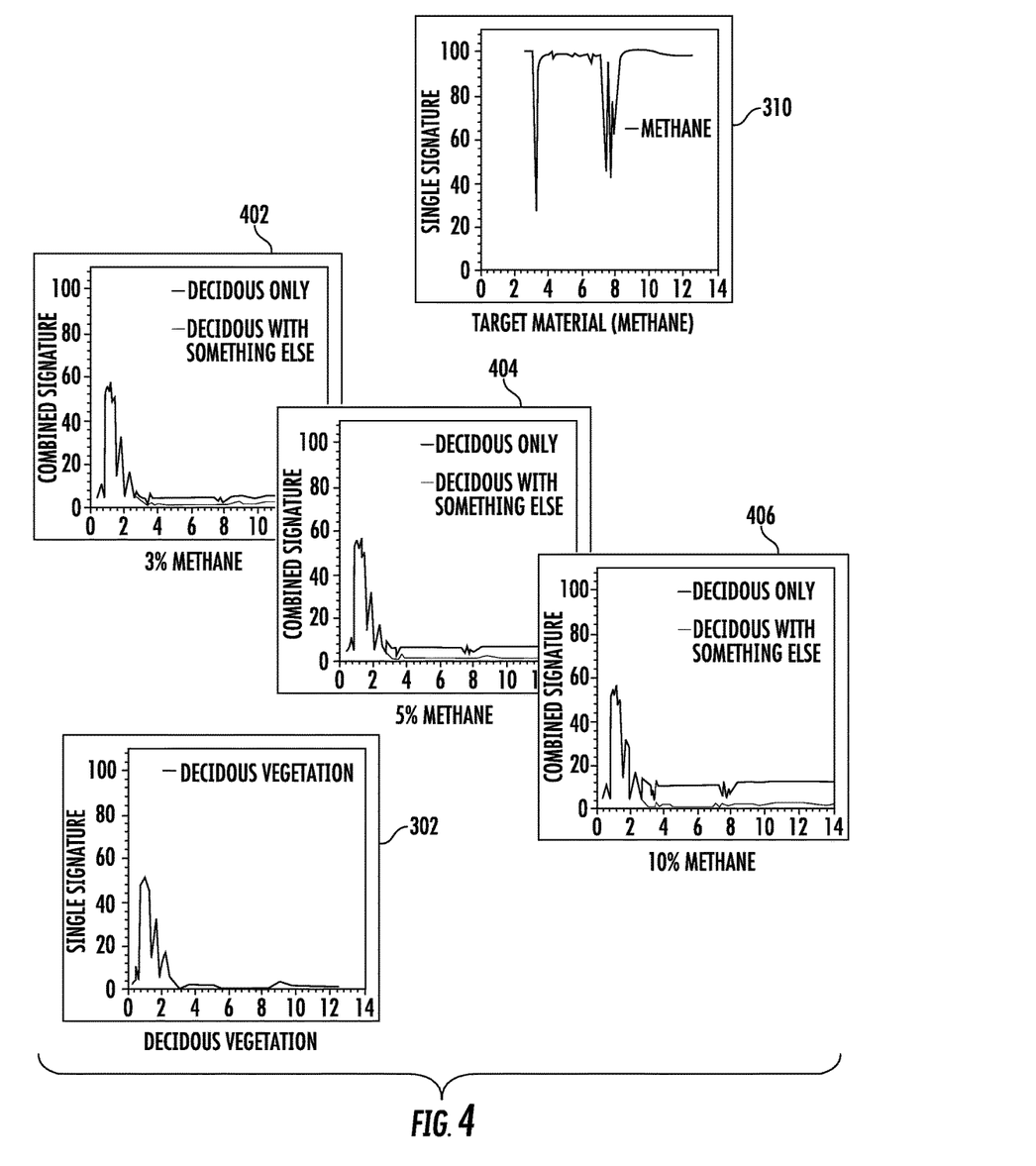
FIGS. 4 and 5 illustrate spectral models of various mixtures of methane with respectively plate glass and deciduous vegetation, according to example implementations.
Figure 5:
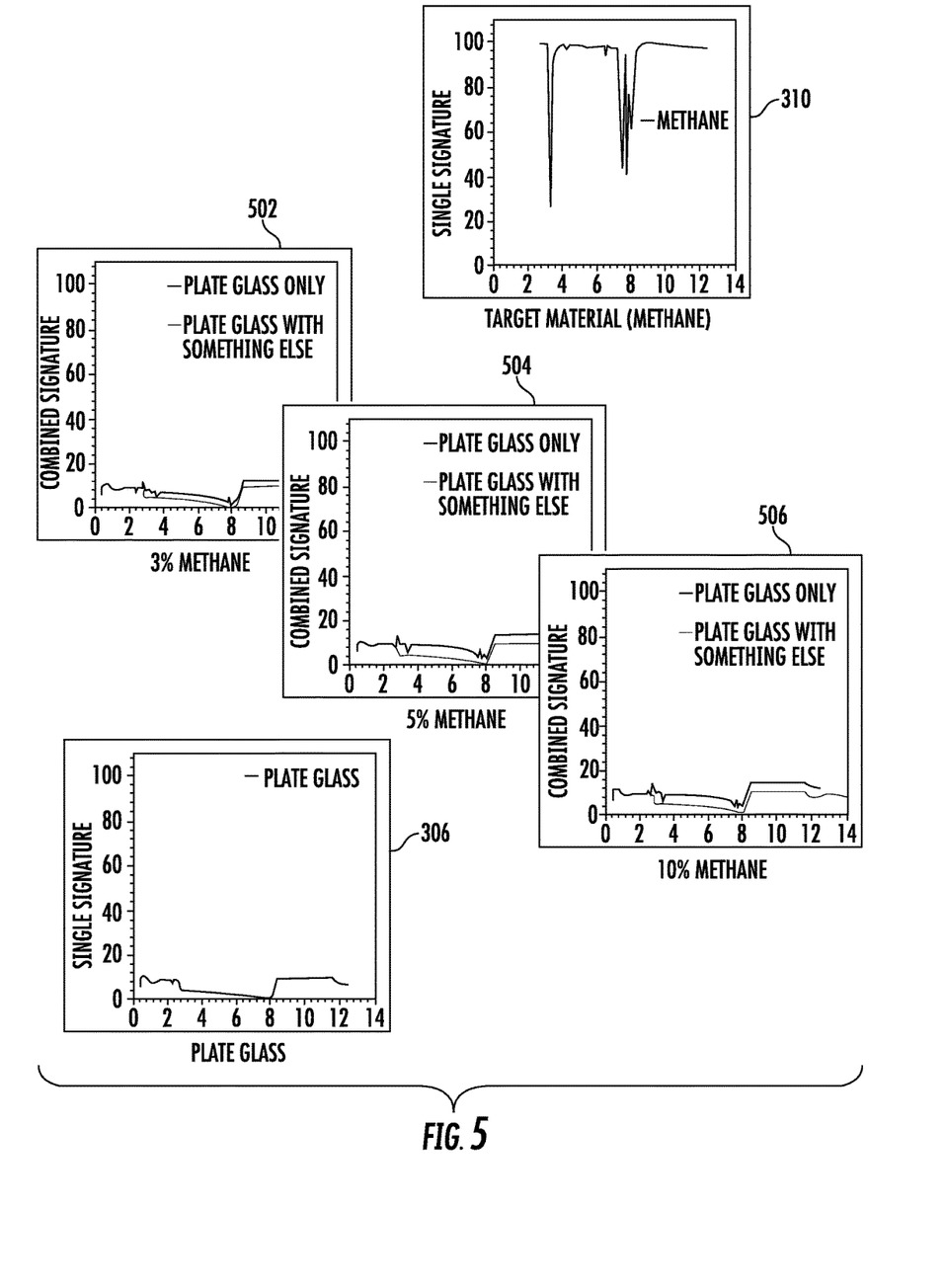

FIG. 4 illustrates the spectral model of deciduous vegetation 302, spectral data for methane 310, and for mixtures of different percentages of methane and deciduous vegetation, including 3% methane 402, 5% methane 404 and 10% methane 406. FIG. 5 illustrates the spectral model of plate glass 306, spectral data for methane, and for mixtures of different percentages of methane and plate glass, including 3% methane 502, 5% methane 504 and 10% methane 506. As shown in the figures, the methane gas has measurable reflectance at the characteristic wavelengths.

Figure 6:
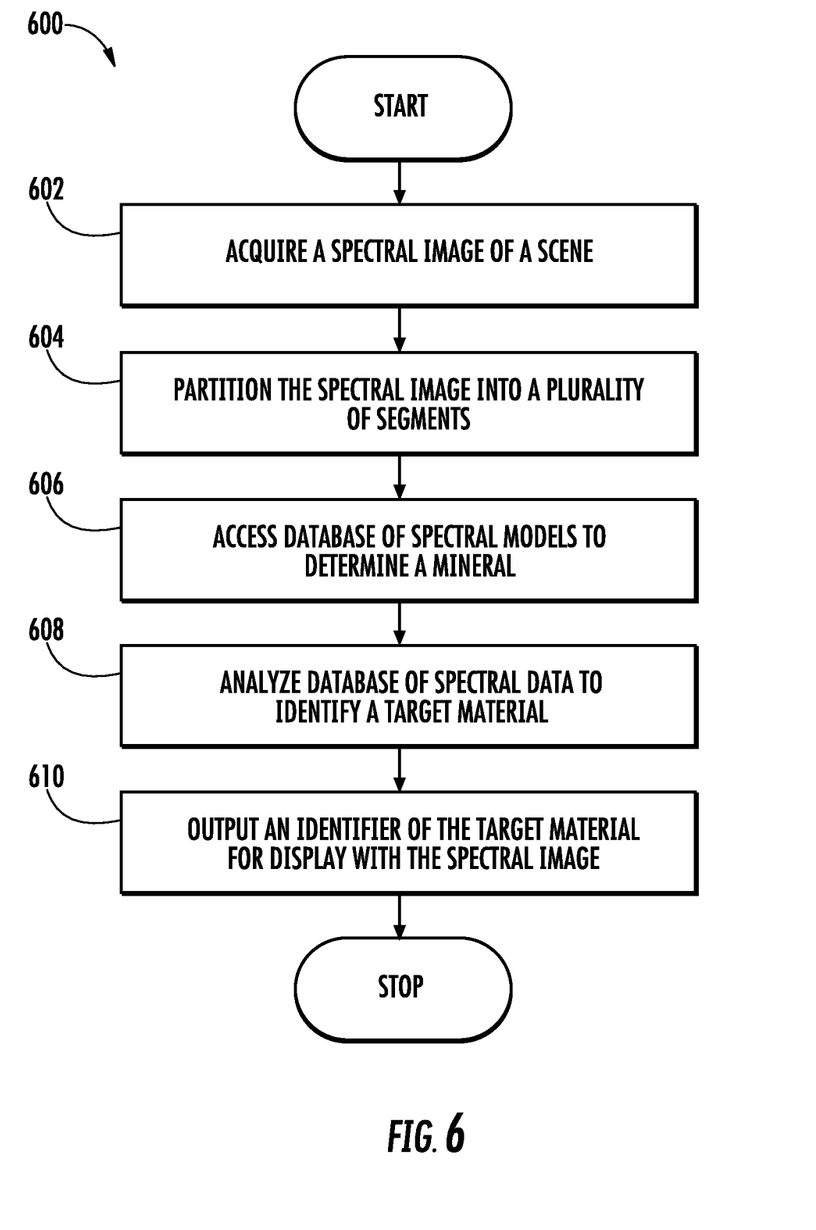
FIG. 6 is a flowchart illustrating various steps in a method according to various example implementations.

FIG. 6 is a flowchart illustrating various steps in a method 600 for identifying a target material in a spectral image. As shown at block 602, the method includes acquiring a spectral image of a scene, the spectral image being composed of a plurality of pixels each of which has spectral data. As shown in block 604, the method includes performing image segmentation to partition the spectral image into a plurality of segments each of which includes a respective set of pixels of the spectral image that are similar with respect to the spectral data, the spectral image including spectral data for each segment of the plurality of segments; and for a segment of the plurality of segments. As shown in block 606, the method includes accessing a database of spectral models of a plurality of materials to determine a material whose spectral model is most similar to the spectral data for the segment, a difference between the spectral model of the material and the spectral data for the segment including measurable reflectance or radiance at characteristic frequencies or wavelengths. The method includes analyzing a database of spectral data for a plurality of target materials to identify a target material whose spectral data also has measurable reflectance or radiance at the characteristic frequencies or wavelengths, as shown in block 608. And the method includes outputting an identifier of the target material for display with the spectral image, as shown in block 610.

According to example implementations of the present disclosure, the target material identification system 100 and its subsystems including the segmentation subsystem 102 and target ID subsystem 104 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 7:
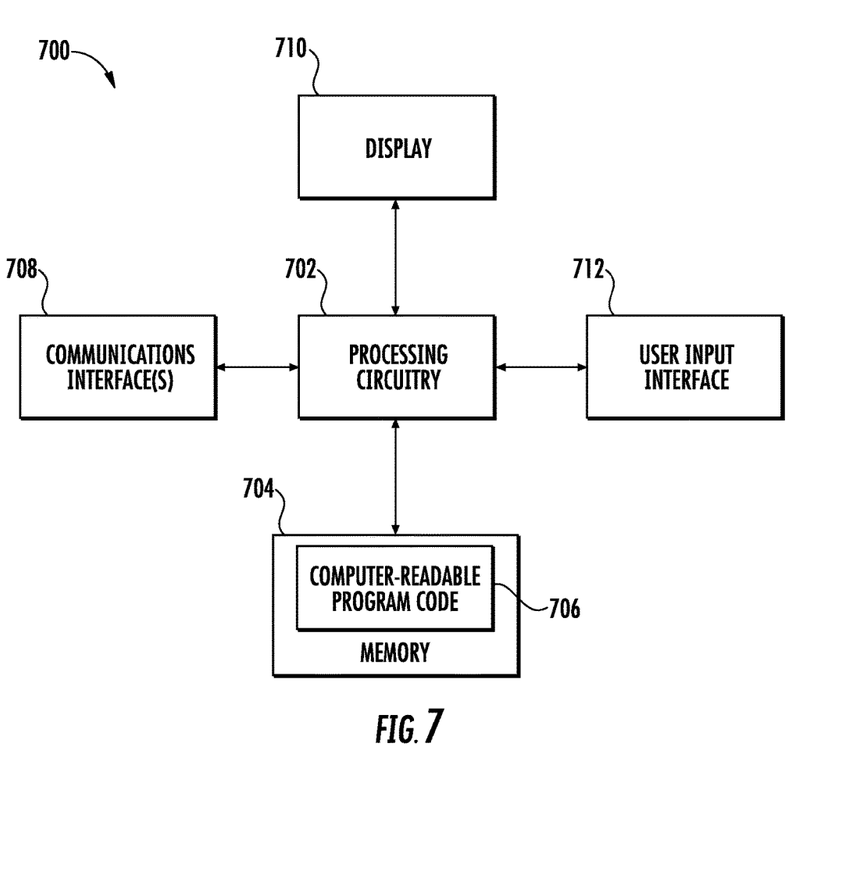
FIG. 7 illustrates an apparatus according to some example implementations.

FIG. 7 illustrates an apparatus 700 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 702 (e.g., processor unit) connected to a memory 704 (e.g., storage device).

The processor 702 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 704 (of the same or another apparatus).

The processor 702 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more ASICs, FPGAs or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 704 is generally any piece of computer hardware that is capable of storing information such as, for example, data, computer programs (e.g., computer-readable program code 706) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 704, the processor 702 may also be connected to one or more interfaces for displaying, transmitting and/or receiving information. The interfaces may include a communications interface 708 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 710 and/or one or more user input interfaces 712 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touch screen), biometric sensor or the like. The user interfaces may further include one or more interfaces for communicating with peripherals such as printers, scanners or the like.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by processor, or storage of instructions in a computer-readable storage medium, supports combinations of operations for performing the specified functions. In this manner, an apparatus 700 may include processor 702 and a computer-readable storage medium or memory 704 coupled to the processor, where the processor is configured to execute computer-readable program code 706 stored in the memory. It will also be understood that one or more functions, and combinations of functions, may be implemented by special purpose hardware-based computer systems and/or processor which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for identifying a target material in a spectral image, the apparatus comprising a processor and a memory storing executable instructions that, in response to execution by the processor, cause the apparatus to at least:
   acquire a spectral image of a scene, the spectral image being composed of a plurality of pixels each of which has spectral data;
   perform image segmentation to partition the spectral image into a plurality of segments each of which includes a respective set of pixels of the spectral image that are similar with respect to the spectral data, the spectral image including spectral data for each segment of the plurality of segments; and for a segment of the plurality of segments,
   access a database of spectral models of a plurality of materials to determine a material whose spectral model is most similar to the spectral data for the segment, a difference between the spectral model of the material and the spectral data for the segment including measurable reflectance or radiance at characteristic frequencies or wavelengths;
   analyze a database of spectral data for a plurality of target materials to identify a target material whose spectral data also has measurable reflectance or radiance at the characteristic frequencies or wavelengths, wherein the apparatus being caused to analyze the database of spectral data includes being caused to:
   mix the spectral model of the material with various ones of the spectral data from the database of spectral data to determine a spectral model of a composition of the material and a target material that is most similar to the spectral data for the segment; and
   identify the target material in the composition as the target material whose spectral data also has measurable reflectance or radiance at the characteristic frequencies or wavelengths; and
   output an identifier of the target material for display with the spectral image.

2. The apparatus of claim 1, wherein the spectral data for each segment satisfies a predetermined statistical criterion of spectral data for the respective set of pixels in the segment.

3. The apparatus of claim 1, wherein the apparatus is caused to access and analyze respectively the database of spectral models and the database of spectral data for each segment of the plurality of segments to identify the target material for the segment, and any target material in any other segment of the plurality of segments.

4. The apparatus of claim 1, wherein the database of spectral data includes for at least some of the target materials, spectral data in different percentages of the target materials, and the apparatus is caused to analyze the database of spectral data to identify a target material of a particular percentage that also has measurable reflectance or radiance at the characteristic frequencies or wavelengths.

5. The apparatus of claim 1, wherein the database of spectral data includes measurable reflectance or radiance only at key frequencies or wavelengths, and the apparatus being caused to analyze the database of spectral data includes being caused to analyze the database of spectral data to identify the target material whose spectral data with key frequencies or wavelengths that most closely match the characteristic frequencies or wavelengths.

6. The apparatus of claim 1, wherein the memory stores executable instructions that, in response to execution by the processor, cause the apparatus to further produce difference spectral data from the difference between the spectral model of the material and the spectral data for the segment, and wherein the apparatus being caused to analyze the database of spectral data includes being caused to analyze the database of spectral data to identify the target material whose spectral data most closely matches the difference spectral data.

7. A method identifying a target material in a spectral image, the method comprising:

acquiring a spectral image of a scene, the spectral image being composed of a plurality of pixels each of which has spectral data;

performing image segmentation to partition the spectral image into a plurality of segments each of which includes a respective set of pixels of the spectral image that are similar with respect to the spectral data, the spectral image including spectral data for each segment of the plurality of segments; and for a segment of the plurality of segments, accessing a database of spectral models of a plurality of materials to determine a material whose spectral model is most similar to the spectral data for the segment, a difference between the spectral model of the material and the spectral data for the segment including measurable reflectance or radiance at characteristic frequencies or wavelengths;

analyzing a database of spectral data for a plurality of target materials to identify a target material whose spectral data also has measurable reflectance or radiance at the characteristic frequencies or wavelengths, wherein analyzing the database of spectral data comprises:

mixing the spectral model of the material with various ones of the spectral data from the database of spectral data to determine a spectral model of a composition of the material and a target material that is most similar to the spectral data for the segment; and identifying the target material in the composition as the target material whose spectral data also has measurable reflectance or radiance at the characteristic frequencies or wavelengths; and outputting an identifier of the target material for display with the spectral image.

8. The method of claim 7, wherein the spectral data for each segment satisfies a predetermined statistical criterion of spectral data for the respective set of pixels in the segment.

9. The method of claim 7, wherein the database of spectral models and the database of spectral data are respectively accessed and analyzed for each segment of the plurality of segments to identify the target material for the segment, and any target material in any other segment of the plurality of segments.

10. The method of claim 7, wherein the database of spectral data includes for at least some of the target materials, spectral data in different percentages of the target materials, the database of spectral data being analyzed to identify a target material of a particular percentage that also has measurable reflectance or radiance at the characteristic frequencies or wavelengths.

11. The method of claim 7, wherein the database of spectral data includes measurable reflectance or radiance only at key frequencies or wavelengths, and analyzing the database of spectral data includes analyzing the database of spectral data to identify the target material whose spectral data with key frequencies or wavelengths that most closely match the characteristic frequencies or wavelengths.

12. The method of claim 7 further comprising producing difference spectral data from the difference between the spectral model of the material and the spectral data for the segment, and wherein analyzing the database of spectral data includes analyzing the database of spectral data to identify the target material whose spectral data most closely matches the difference spectral data.

13. A computer-readable storage medium that is non-transitory and has computer-readable program code portions stored therein that in response to execution by a processor, cause an apparatus to at least:

acquire a spectral image of a scene, the spectral image being composed of a plurality of pixels each of which has spectral data;

perform image segmentation to partition the spectral image into a plurality of segments each of which includes a respective set of pixels of the spectral image that are similar with respect to the spectral data, the spectral image including spectral data for each segment of the plurality of segments; and for a segment of the plurality of segments, access a database of spectral models of a plurality of materials to determine a material whose spectral model is most similar to the spectral data for the segment, a difference between the spectral model of the material and the spectral data for the segment including measurable reflectance or radiance at characteristic frequencies or wavelengths;

analyze a database of spectral data for a plurality of target materials to identify a target material whose spectral data also has measurable reflectance or radiance at the characteristic frequencies or wavelengths, wherein the apparatus being caused to analyze the database of spectral data includes being caused to:

mix the spectral model of the material with various ones of the spectral data from the database of spectral data to determine a spectral model of a composition of the material and a target material that is most similar to the spectral data for the segment; and identify the target material in the composition as the target material whose spectral data also has measurable reflectance or radiance at the characteristic frequencies or wavelengths; and output an identifier of the target material for display with the spectral image.

14. The computer-readable storage medium of claim 13, wherein the spectral data for each segment satisfies a predetermined statistical criterion of spectral data for the respective set of pixels in the segment.

15. The computer-readable storage medium of claim 13, wherein the apparatus is caused to respectively access and analyze the database of spectral models and the database of spectral data for each segment of the plurality of segments to identify the target material for the segment, and any target material in any other segment of the plurality of segments.

16. The computer-readable storage medium of claim 13, wherein the database of spectral data includes for at least some of the target materials, spectral data in different percentages of the target materials, and the apparatus is caused to analyze the database of spectral data to identify a target material of a particular percentage that also has measurable reflectance or radiance at the characteristic frequencies or wavelengths.

17. The computer-readable storage medium of claim 13, wherein the database of spectral data includes measurable reflectance or radiance only at key frequencies or wavelengths, and the apparatus being caused to analyze the database of spectral data includes being caused to analyze the database of spectral data to identify the target material whose spectral data with key frequencies or wavelengths that most closely match the characteristic frequencies or wavelengths.

18. The computer-readable storage medium of claim 13, wherein computer-readable storage medium has computer-readable program code portions stored therein that in response to execution by the processor, cause the apparatus to further produce difference spectral data from the difference between the spectral model of the material and the spectral data for the segment, and wherein the apparatus being caused to analyze the database of spectral data includes being caused to analyze the database of spectral data to identify the target material whose spectral data most closely matches the difference spectral data.

* * * * *